United States Patent
Tsao et al.

(10) Patent No.: US 7,944,424 B2
(45) Date of Patent: May 17, 2011

(54) PIXEL CONTROL DEVICE AND DISPLAY APPARATUS UTILIZING SAID PIXEL CONTROL DEVICE

(75) Inventors: Cheng-Han Tsao, Hsinchu (TW); Yi-Pai Huang, Hsinchu (TW); Ting-Jui Chang, Hsinchu (TW); Hou Lung Hou, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 944 days.

(21) Appl. No.: 11/838,979

(22) Filed: Aug. 15, 2007

(65) Prior Publication Data

US 2008/0211983 A1 Sep. 4, 2008

(30) Foreign Application Priority Data

Mar. 3, 2007 (TW) ................................ 96107376 A

(51) Int. Cl.
*G09G 3/36* (2006.01)
(52) U.S. Cl. .............................. 345/92; 345/87; 345/204
(58) Field of Classification Search .......... 345/204–215, 345/87–104; 349/38, 42, 43, 48, 139
See application file for complete search history.

(56) References Cited

U.S. PATENT DOCUMENTS

| | | | |
|---|---|---|---|
| 4,840,460 A | 6/1989 | Bernot et al. | |
| 5,903,249 A * | 5/1999 | Koyama et al. | 345/92 |
| 6,486,930 B1 * | 11/2002 | Kwon | 349/48 |
| 6,859,194 B2 | 2/2005 | Aoyama et al. | |
| 6,982,690 B2 * | 1/2006 | Lee et al. | 345/87 |
| 7,034,789 B2 * | 4/2006 | Takeuchi et al. | 345/90 |
| 7,116,303 B2 * | 10/2006 | Park | 345/92 |
| 7,212,183 B2 * | 5/2007 | Tobita | 345/93 |
| 7,495,735 B2 * | 2/2009 | Kim et al. | 349/143 |
| 7,714,823 B2 * | 5/2010 | Chen et al. | 345/87 |
| 2004/0218109 A1 | 11/2004 | Koo et al. | |
| 2005/0195139 A1 * | 9/2005 | Shih et al. | 345/87 |
| 2005/0219186 A1 | 10/2005 | Kamada et al. | |
| 2006/0097972 A1 * | 5/2006 | Takeuchi et al. | 345/90 |
| 2006/0103800 A1 * | 5/2006 | Li et al. | 349/129 |
| 2006/0250533 A1 * | 11/2006 | Shih | 349/38 |
| 2006/0262237 A1 * | 11/2006 | Chen et al. | 349/38 |
| 2006/0268186 A1 * | 11/2006 | Kamada et al. | 349/38 |
| 2006/0274009 A1 * | 12/2006 | Lee | 345/92 |
| 2006/0290827 A1 * | 12/2006 | Kihara et al. | 349/38 |
| 2007/0064164 A1 * | 3/2007 | Tasaka et al. | 349/38 |

FOREIGN PATENT DOCUMENTS

CN 1677179 10/2005

OTHER PUBLICATIONS

Chinese language office action dated Mar. 28, 2008.

* cited by examiner

*Primary Examiner* — Alexander Eisen
*Assistant Examiner* — Patrick Marinelli
(74) *Attorney, Agent, or Firm* — Thomas, Kayden, Horstemeyer & Risley, LLP

(57) ABSTRACT

A pixel control device and a display apparatus utilizing said pixel control device are provided. The pixel control device is electrically connected to a sub-pixel area to provide a first voltage level, a second voltage level, and a third voltage level to the sub-pixel area, so that liquid crystals can be disposed in various angles. A scan line of the pixel control device controls a first transistor, a second transistor, and a third transistor to be switched on. The first and second data lines thereof provide a first and a second data-referenced voltage levels, respectively, to determine the first, the second, and the third voltage levels.

10 Claims, 6 Drawing Sheets

PIXEL CONTROL DEVICE AND DISPLAY APPARATUS UTILIZING SAID PIXEL CONTROL DEVICE

This application claims priority to Taiwan Patent Application No. 096107376 filed on Mar. 3, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a pixel control device and a display apparatus. More particularly, the present invention relates to a pixel control device and a display apparatus used in conjunction with the multi-domain vertical alignment (MVA) technology.

2. Descriptions of the Related Art

Limited by technologies and materials, early generations of liquid crystal display (LCD) screens provided relatively small viewing angles, low contrast qualities, and few pixels. Due to their relatively small sizes, earlier LCD screens were solely used in small portable devices, such as notebook computers, mobile phones, and personal digital assistants (PDA), where the viewing angle was not a key factor in determining the quality of the LCD screens. However, in recent years, as larger LCD screens were demanded in desktop computers and TV sets, the viewing angle became a key factor in determining the quality of the LCD screens.

Such a problem can be resolved by using multi-domain vertical alignment technologies (abbreviated as MVA hereinafter), which arrange the liquid crystals of the LCD screens in more than one direction, thereby, enlarging the range of viewing angles.

FIG. 1A depicts a schematic side view of a sub-pixel 1 in an LCD screen employing the prior MVA technologies. This sub-pixel 1 has a first electrode terminal 11, a second electrode terminal 12, a third electrode terminal 13, and a plurality of liquid crystals 14. When a first voltage level is applied to the first electrode terminal 11 and a second voltage level is applied to both the second electrode terminal 12 and the third electrode terminal 13 simultaneously, these liquid crystals 14 will be disposed at the same angle. In this sense, such MVA technologies support four domains. FIG. 1B depicts a schematic top view of the sub-pixel, wherein the regions circled by the dashed lines 151, 152, 153, 154 represent four domains.

However, LCD screens employing the four-domain MVA technologies wash out at large viewing angles. Washing out refers to the degradation of the perceived chrominance of the picture that the user views. As expected, these LCD screens are undesired by users.

In summary, it is important to manufacture LCD screens with wide viewing angles, while using MVA technologies and preventing washouts at large viewing angles.

SUMMARY OF THE INVENTION

An objective of the present invention is to provide a pixel control device. The pixel control device is electrically connected to a sub-pixel to provide a first, a second, and a third voltage level to the sub-pixel. The pixel control device comprises a first transistor, a second transistor, a third transistor, a scan line, a first data line, and a second data line. The scan line is used to control the first, the second, and the third transistor to be switched on. The first data line is used to provide a first data-referenced voltage level to the first transistor and the second transistor when the first transistor and the second transistor are switched on. The second data line is used to provide a second data-referenced voltage level to the third transistor when the third transistor is switched on. The first voltage level and the first data-referenced voltage level form a first ratio. The second voltage level and the first data-referenced voltage level form a second ratio. The third voltage level and the second data-referenced voltage level form a third ratio.

Another objective of the present invention is to provide a display apparatus. The display apparatus comprises a display array and a pixel control device. The display array has a plurality of pixels, wherein each of the pixels has a plurality of sub-pixels. The pixel control device is electrically connected to one of the sub-pixels to provide a first voltage level, a second voltage level, and a third voltage level to the sub-pixel. The pixel control device comprises a first transistor, a second transistor, a third transistor, a scan line, a first data line, and a second data line. The scan line is used to control the first transistor, the second transistor, and the third transistor to be switched on. The first data line is used to provide a first data-referenced voltage level to the first transistor and the second transistor when the first transistor and the second transistor are switched on. The second data line is used to provide a second referenced voltage level to the third transistor when the third transistor is switched on. The first voltage level and the first data-referenced voltage level form a first ratio. The second voltage level and the first data-referenced voltage level form a second ratio. The third voltage level and the second data-referenced voltage level form a third ratio.

With the aforesaid configurations, the drive control device in accordance with the present invention can provide three voltage levels to control the tilting angle of the liquid crystals in an LCD apparatus. In this way, each sub-pixel in an LCD apparatus is divided into three areas. Since MVA technologies provide four domains, there are a total of twelve domains per sub-pixel. As a result, the difference between the picture perceived at a normal viewing angle and the picture perceived at a larger viewing angle can be mitigated. Hence, washouts are prevented.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
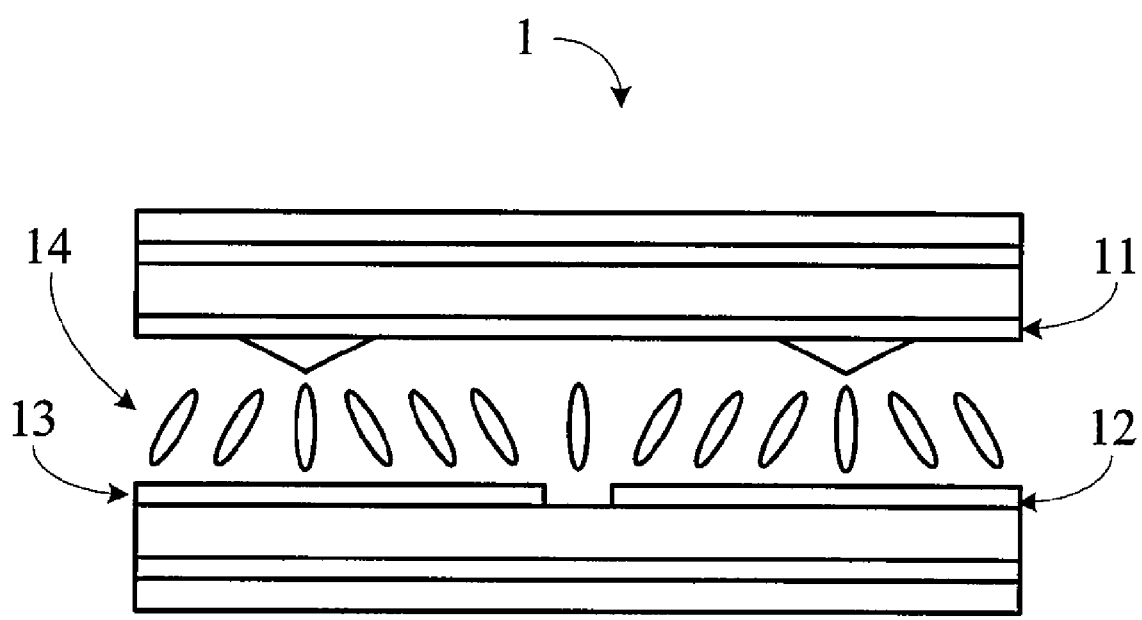
FIG. 1A depicts a schematic side view of a sub-pixel area in an LCD screen employing prior MVA technologies.
Figure 1B:
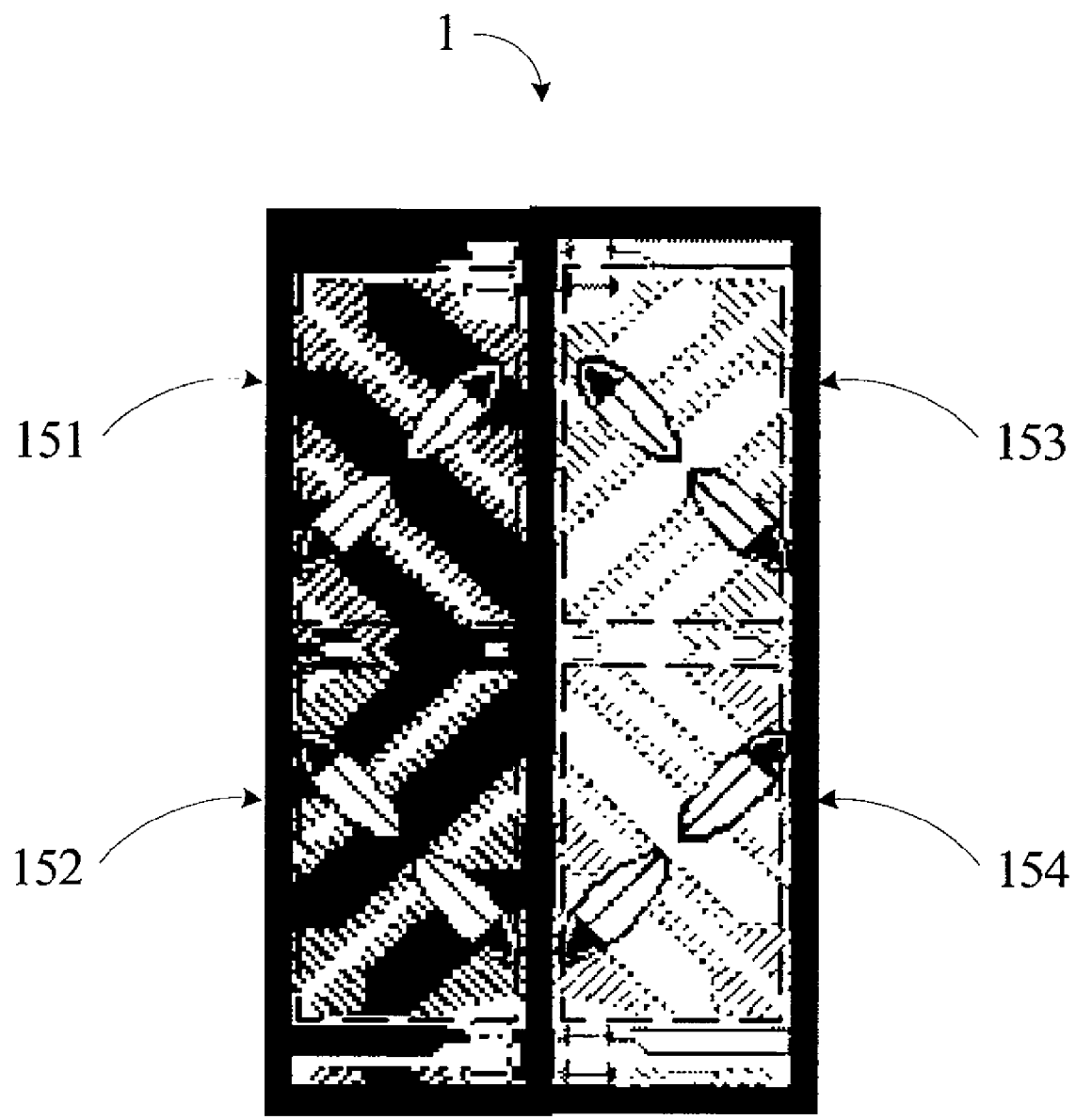
FIG. 1B depicts a schematic top view of said sub-pixel area in FIG. 1A.
Figure 2:
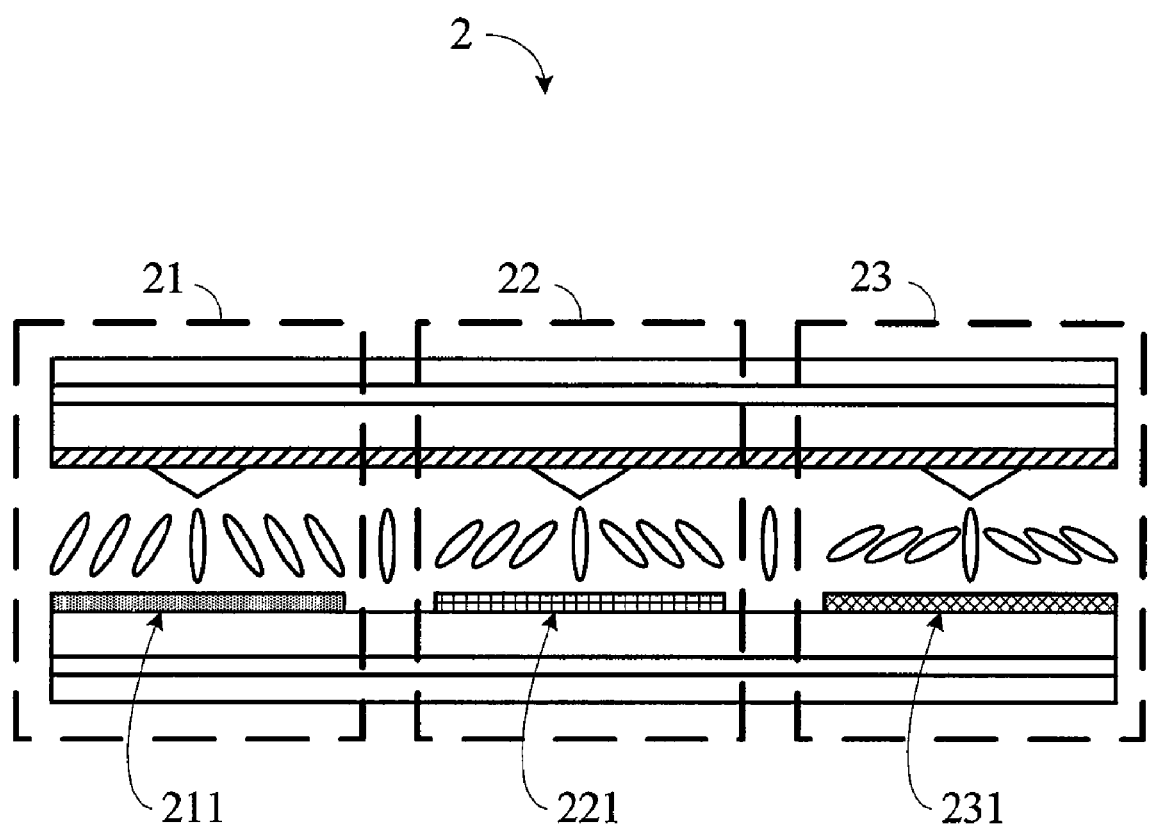
FIG. 2 depicts the concept of the present invention.

FIG. 2 depicts a sub-pixel 2 in an LCD apparatus of the present invention. By providing three different voltage levels to a first electrode terminal 211, a second electrode terminal 221, and a third electrode terminal 231 of the sub-pixel 2, the sub-pixel 2 is divided into three areas, i.e., a first area 21, a second area 22, and a third area 23. Liquid crystals in the three areas 21, 22, 23 are disposed in different angles in response to the three different voltage levels. Since each voltage level creates four domains, there are a total of twelve domains in each sub-pixel of the present invention.

Figure 3:
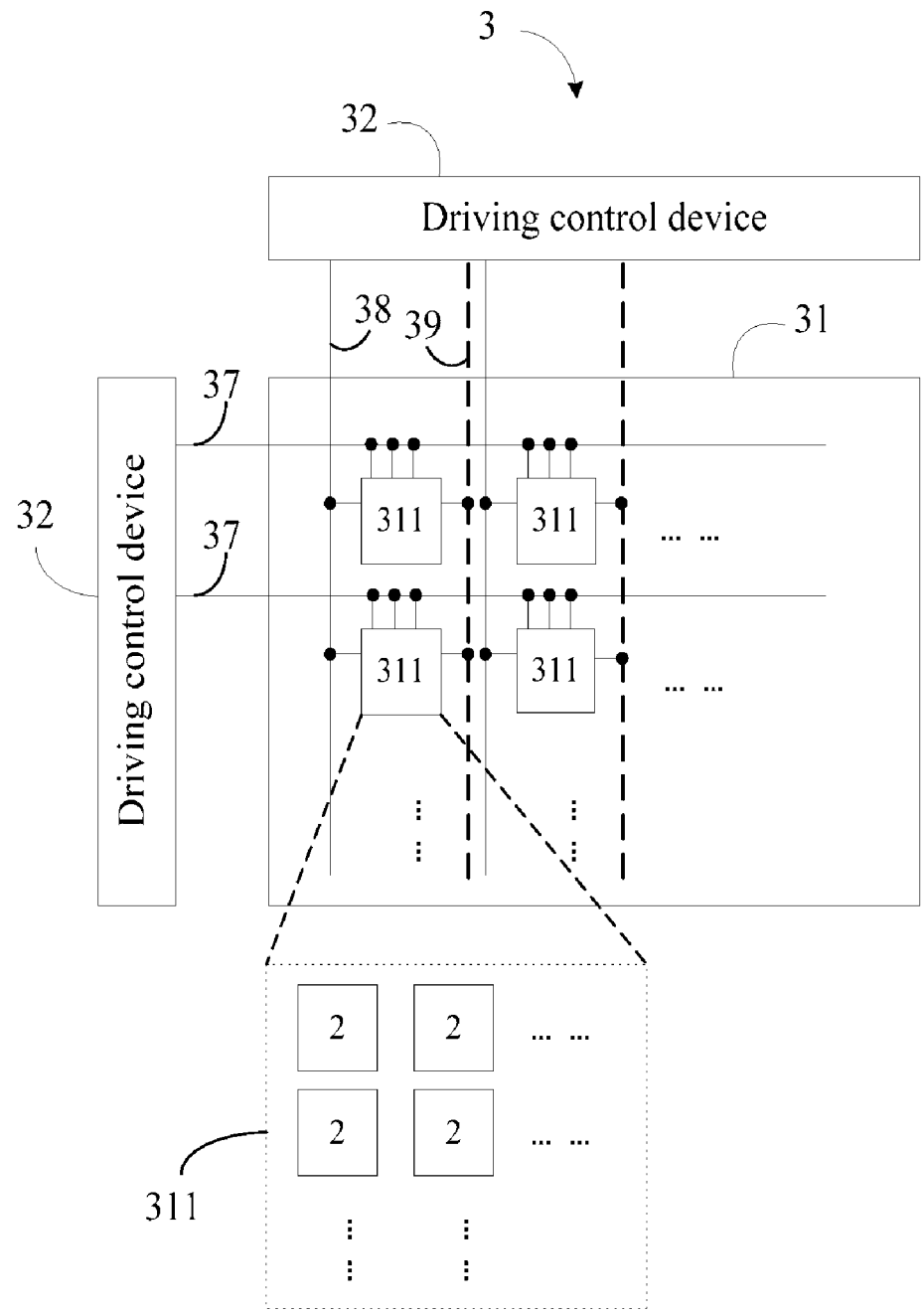
FIG. 3 depicts a schematic view of a display apparatus using the pixel control device of the present invention.

FIG. 3 depicts a schematic view of a display apparatus utilizing the pixel control device in accordance with the present invention. The display apparatus 3 comprises a display array 31 and a driving control device 32. The display array 31 has a plurality of pixels 311 and each pixel 311 further comprises a plurality of sub-pixels to determine the luminance and chrominance of the pixel, wherein each of the sub-pixels corresponds to a pixel control device of the present invention. Each of the pixel control devices comprises a first transistor (not shown), a second transistor (not shown), a third transistor (not shown), a scan line 37, a first data line 38, and a second data line 39. The scan line 37 is used to control the first transistor, the second transistor, and the third transistor to be switched on. The first data line 38 is used to provide a first data-referenced voltage level to the first transistor and the second transistor when the first transistor and the second transistor are switched on. The second data line 39 is used to provide a second data-referenced voltage level to the third transistor when the third transistor is switched on.

Figure 4A:
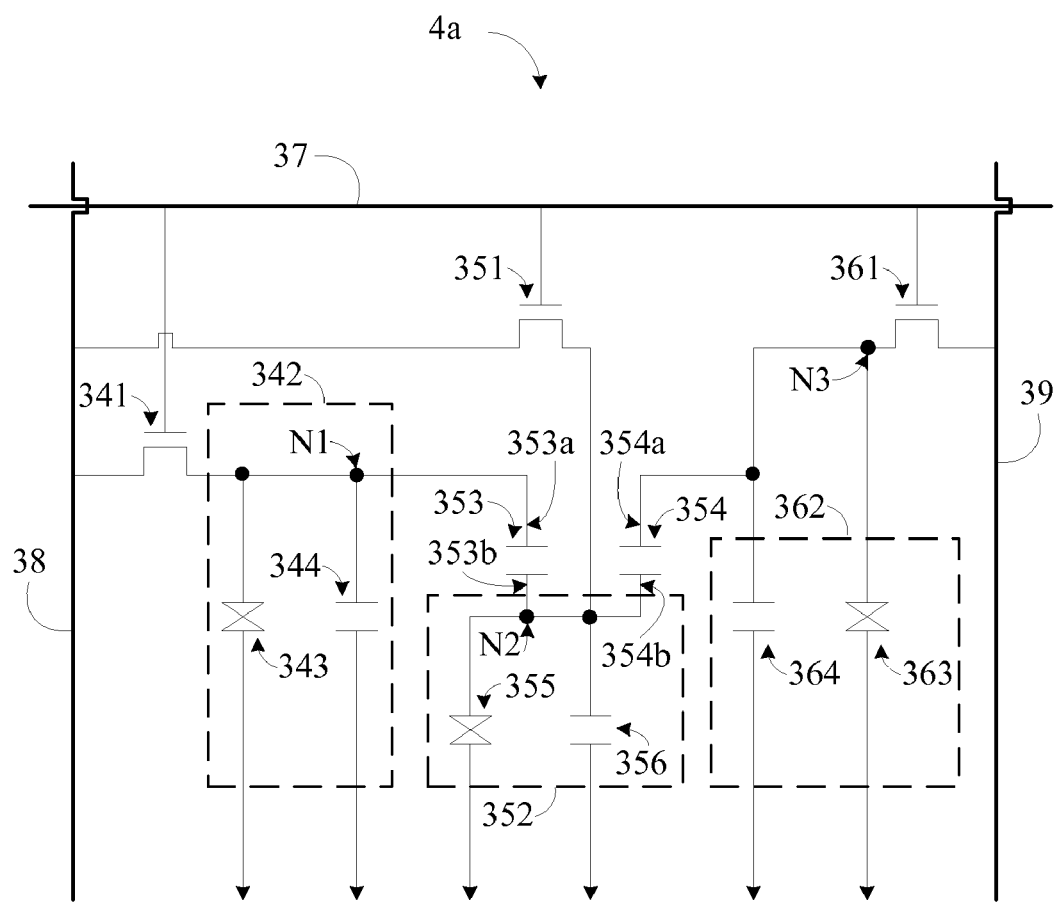
FIG. 4A depicts a pixel control device of a first embodiment of the present invention.

FIG. 4A depicts a pixel control device 4a of a first embodiment in accordance with the present invention. The pixel control device 4a is electrically connected to a sub-pixel to provide a first voltage level, a second voltage level, and a third voltage level to the sub-pixel area.

The pixel control device 4a comprises a first transistor 341, a second transistor 351, a third transistor 361, a first energy storing device 342, a second energy storing device 352, a third energy storing device 362, a first capacitor 353, a second capacitor 354, a scan line 37, a first data line 38, and a second data line 39.

The first transistor 341, the second transistor 351, and the third transistor 361 all have a gate, a source, and a drain, respectively. The respective gates of the first transistor 341, the second transistor 351, and the third transistor 361 are all coupled to the scan line 37, while the respective sources of the first transistor 341 and the second transistor 351 are coupled to the first data line 38. The source of the third transistor 361 is coupled to the second data line 39.

Both the first capacitor 353 and the second capacitor 354 have a fixed capacitance and respectively have a first terminal 353a, 354a and a second terminal 353b, 354b. The first terminal 353a of the first capacitor 353 is coupled to the drain of the first transistor 341, while the second terminal 353b of the first capacitor 353 is coupled to the drain of the second transistor 351. Similarly, the first terminal 354a of the second capacitor 354 is coupled to the drain of the third transistor 361, while the second terminal 354b of the second capacitor 354 is coupled to the drain of the second transistor 351.

The first energy storing device 342 is coupled to the drain of the first transistor 341, while the second energy storing device 352 is coupled to the second terminal 353b of the first capacitor 353 and the second terminal 354b of the second capacitor 354. The third energy storing device 362 is coupled to the drain of the third transistor 361 and the first terminal 354a of the second capacitor 354.

The scan line 37 is used to control the first transistor 341, the second transistor 351, and the third transistor 361 to be switched on. When the first transistor 341 and the second transistor 351 are switched on, the first data line 38 provides a first data-referenced voltage level to the first transistor 341. The first energy storing device 342 generates a first voltage level in response to the first data-referenced voltage level; that is, the node N1 contains the first voltage level. The node N1 is connected to the first electrode terminal 211 in FIG. 2, to provide the first voltage level to the first area 21. Here, the first voltage level and the first data-referenced voltage level form a first ratio.

Additionally, the first data line 38 also provides the first data-referenced voltage level to the second transistor 351. Since the third transistor 361 can be switched on at the same time, the second data line 39 provides a second data-referenced voltage level to the second energy storing device 352 and the third energy storing device 362. As a result, the second energy storing device 352 generates the second voltage level in response to both the first data-referenced voltage level and the second data-referenced voltage level. More specifically, with the first voltage level divided by the first capacitor 353 and the second data-referenced voltage level divided by the second capacitor 354, a second voltage level is generated at a node N2, wherein the second voltage level and the first data-referenced voltage level form a second ratio. The node N2 is connected to the second electrode terminal 221 in FIG. 2 to provide the second voltage level to the second area 22.

The second data-referenced voltage level on the second data line 39 is sent to the third energy storing device 362 via the third transistor 361. The third energy storing device 362 generates a third voltage level at a node N3 in response to the second data-referenced voltage level. The node N3 is connected to the third electrode terminal 231 in FIG. 2 to provide the third voltage level to a third area 23. Here, the third voltage level and the second data-referenced voltage level forms a third ratio.

The first energy storing device 342 comprises a third capacitor 343 with a variable capacitance and a fourth capacitor 344 with a fixed capacitance connected in parallel, wherein the aforesaid first ratio may be adjusted according to the variable capacitance of the third capacitor 343. In other words, the first ratio is determined according to the electric charging capacity of the first energy storing device 342. The second energy storing device 352 comprises a fifth capacitor 355 with a variable capacitance and a sixth capacitor 356 with a fixed capacitance connected in parallel, wherein the aforesaid second ratio may be adjusted according to the variable capacitance of the fifth capacitor 355. In other words, the second ratio is determined according to the electric charging capacity of the second energy storing device 352. The third energy storing device 362 comprises a seventh capacitor 363 with a variable capacitance and an eighth capacitor 364 with a fixed capacitance connected in parallel, wherein the aforesaid third ratio may be adjusted according to the variable capacitance of the seventh capacitor 363. In other words, the third ratio is determined according to the electric charging capacity of the third energy storing device 362.

In order for the sub-pixel to display luminance of medium or low gray scales, the first data-referenced voltage level provided by the first data line 38 is greater than the second data-referenced voltage level. The first data-referenced voltage level is coupled to the second energy storing device 352 via the first capacitor 353, while the second data-referenced voltage level is coupled to the second energy storing device 352 via the second capacitor 354. Since the resulting capacitance of the parallel third capacitor 343 and fourth capacitor 344 is higher than the resulting capacitance of the parallel seventh capacitor 363 and eighth capacitor 364, the first area 21 stays in the brightest state. As the first voltage level, second voltage level, and third voltage level are different from each other, there are twelve domains in the sub-pixel, which help to reduce the gamma value at large viewing angles.

On the other hand, in order for the sub-pixel to display luminance of higher gray scales, the first data-referenced voltage level is set to be lower than the second data-referenced voltage level because the resulting capacitance of the parallel third capacitor 343 and fourth capacitor 344 is made to be lower than the resulting capacitance of the parallel seventh capacitor 363 and eighth capacitor 364. The luminance in the third area 23 is similar to the luminance in the first area 21. The second data-referenced voltage level is coupled to the second energy storing device 352 via the second capacitor 354, so that the loss of luminance in the second area 22 and the third area 23 will not be significant.

With the aforesaid configurations, the drive control device can provide three voltage levels to control the tilting angles of the liquid crystals in an LCD apparatus. In this way, each sub-pixel in an LCD apparatus is divided into three areas. Since each area has four domains, there are a total of twelve domains per sub-pixel. As a result, the difference between the picture perceived at a normal viewing angle and the picture perceived at a larger angle can be mitigated. Hence, washouts at large viewing angles can be solved.

Figure 4B:
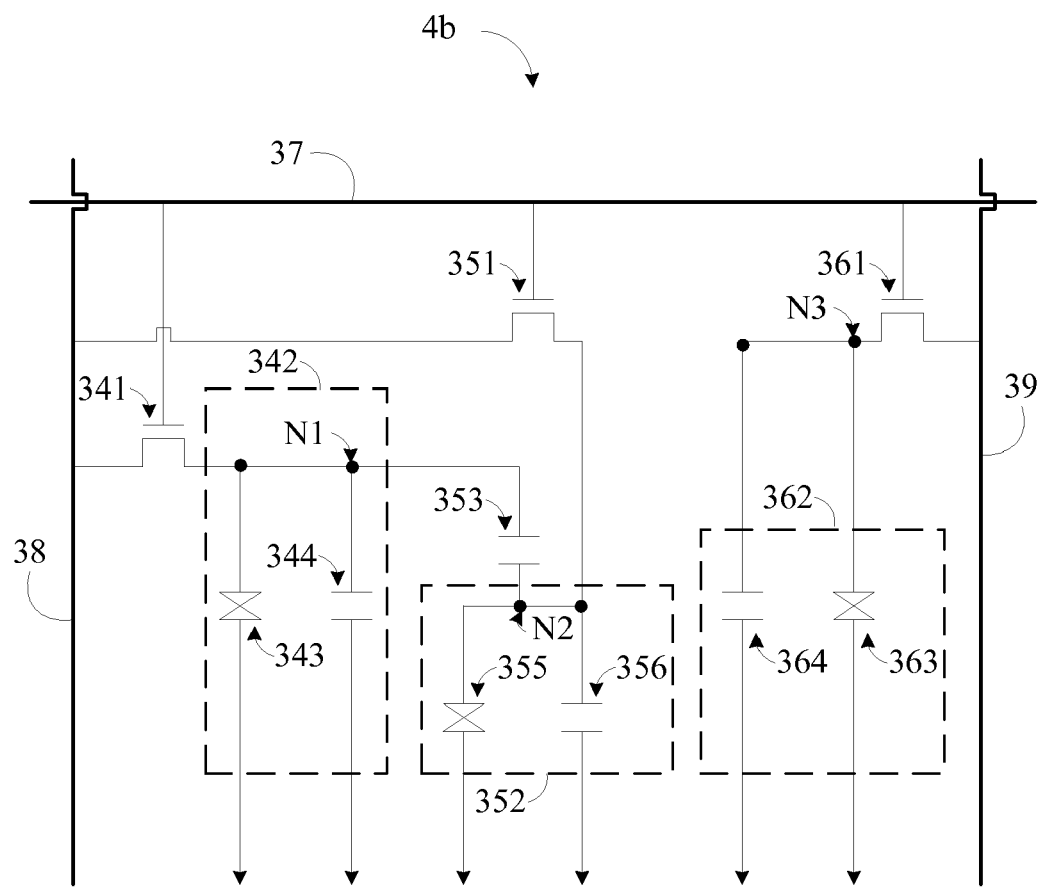
FIG. 4B depicts a pixel control device of a second embodiment of the present invention.

FIG. 4B depicts a pixel control device 4b of a second embodiment in accordance with the present invention. The pixel control device 4b is electrically connected to a sub-pixel to provide a first voltage level, a second voltage level, and a third voltage level to the sub-pixel.

The pixel control device 4b comprises a first transistor 341, a second transistor 351, a third transistor 361, a first energy storing device 342, a second energy storing device 352, a third energy storing device 362, a first capacitor 353, a scan line 37, a first data line 38, and a second data line 39.

The first transistor 341, the second transistor 351, and the third transistor 361 all have a gate, a source, and a drain. The respective gates of the first transistor 341, the second transistor 351, and the third transistor 361 are all coupled to the scan line 37. The respective sources of the first transistor 341 and the second transistor 351 are coupled to the first data line 38. The source of the third transistor 361 is coupled to the second data line 39.

The first capacitor 353 is with a fixed capacitance and has a first terminal 353a and a second terminal 353b. The first terminal 353a of the first capacitor 353 is coupled to the drain of the first transistor 341, while the second terminal 353b of the first capacitor 353 is coupled to the drain of the second transistor 351.

The first energy storing device 342 is coupled to the drain of the first transistor 341, the second energy storing device 352 is coupled to the second terminal 353b of the first capacitor 353 and the drain of the second transistor 351 and third energy storing device 362 are coupled to the drain of the third transistor 361.

The scan line 37 is used to control the first transistor 341, the second transistor 351, and the third transistor 361 to be switched on. When the first transistor 341 and the second transistor 351 are switched on, the first data line 38 provides a first data-referenced voltage level to the first transistor 341. The first energy storing device 342 generates a first voltage level in response to the first data-referenced voltage level. That is, a node N1 has a first voltage level, wherein the node N1 is connected to the first electrode terminal 211 in FIG. 2 to provide the first voltage level to the first area 21. Here, the first voltage level and the first data-referenced voltage level form a first ratio.

Additionally, the first data line 38 also provides the first data-referenced voltage level to the second transistor 351.

The second energy storing device 352 generates a second voltage level in response to the first data-referenced voltage level, that is, a node N2 has a second voltage level. The second voltage level and the first data-referenced voltage level form a second ratio. The node N2 is connected to the second electrode terminal 221 in FIG. 2, to provide the second voltage level to the second area 22.

The second data-referenced voltage level on the second data line 39 is sent to the third energy storing device 362 via the third transistor 361. The third energy storing device 362 generates a third voltage level at a node N3 in response to the second data-referenced voltage level. The node N3 is connected to the third electrode terminal 231 in FIG. 2 to provide the third voltage level to the third area 23. Here, the third voltage level and the second data-referenced voltage level form a third ratio.

The first energy storing device 342 comprises a third capacitor 343 with a variable capacitance and a fourth capacitor 344 with a fixed capacitance connected in parallel. The foresaid first ratio may be adjusted according to the variable capacitance of the third capacitor 343. In other words, the first ratio is determined according to the electric charging capacity of the first energy storing device 342. The second energy storing device 352 comprises a fifth capacitor 355 with a variable capacitance and a sixth capacitor 356 with a fixed capacitance connected in parallel. The foresaid second ratio may be adjusted according to the variable capacitance of the fifth capacitor 355. In other words, the second ratio is determined according to the electric charging capacity of the second energy storing device 352. The third energy storing device 362 comprises a seventh capacitor 363 with a variable capacitance and an eighth capacitor 364 with a fixed capacitance connected in parallel. The foresaid third ratio may be adjusted according to the variable capacitance of the seventh capacitor 363. In other words, the third ratio is determined according to the electric charging capacity of the third energy storing device 362.

With the aforesaid configurations, the drive control device can provide three voltage levels to control the tilting angle of the liquid crystals in an LCD apparatus. In this way, each sub-pixel in an LCD apparatus is divided into three areas. As each area has four domains, there are a total of twelve domains per sub-pixel. As a result, the difference between the picture perceived at a normal viewing angle and the picture perceived at a larger viewing angle can be mitigated. Hence, the washouts at large viewing angles can be prevented.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A pixel control device, being electrically connected to a sub-pixel, the pixel control device being configured to provide a first voltage level, a second voltage level, and a third voltage level to the sub-pixel, the pixel control device comprising:
   a first transistor, having a gate, a source and a drain;
   a second transistor, having a gate, a source and a drain;
   a third transistor, having a gate, a source and a drain;
   a first capacitor with fixed capacitance, directly coupled between the drain of the first transistor and the drain of the second transistor;

a second capacitor with fixed capacitance, directly coupled between the drain of the second transistor and the drain of the third transistor;
a scan line, coupled to the gate of the first transistor, the gate of the second transistor and the gate of the third transistor, and for controlling the first transistor, the second transistor, and the third transistor to be switched on;
a first data line, coupled to the source of the first transistor and the source of the second transistor and for providing a first data-referenced voltage level to the first transistor and the second transistor when the first transistor and the second transistor are switched on;
a second data line, coupled to the source of the third transistor and for providing a second data-referenced voltage level to the third transistor when the third transistor is switched on;
a first energy storing device, being coupled to the drain of the first transistor, for providing the first voltage level in response to the first data-referenced voltage level when the first transistor is switched on;
a second energy storing device, being coupled to the second terminal of the first capacitor and the drain of the second transistor, for providing the second voltage level in response to the first data-referenced voltage level when the first transistor and the second transistor are switched on;
and a third energy storing device, comprising a seventh capacitor with variable capacitance and a eight capacitor with fixed capacitance, the seventh capacitor and the eight capacitor being coupled to the drain of the third transistor, for providing the third voltage level in response to the second data-referenced voltage level when the third transistor is switched on;
wherein the first voltage level and the first data-referenced voltage level form a first ratio, the second voltage level and the first data-referenced voltage level form a second ratio, and the third voltage level and the second data-referenced voltage level form a third ratio.

2. The pixel control device of claim 1, wherein the first capacitor has a first terminal and a second terminal, the first terminal of the first capacitor is coupled to the drain of the first transistor, the second terminal of the first capacitor is coupled the drain of the second transistor, the second capacitor has a first terminal and a second terminal, the first terminal of the second capacitor is coupled to the drain of the third transistor, and the second terminal of the second capacitor is coupled to the drain of the second transistor.

3. The pixel control device of claim 1, wherein the first energy storing device further comprises:
a third capacitor with variable capacitance, being coupled to the drain of the first transistor; and
a fourth capacitor with fixed capacitance, being coupled to the drain of the first transistor.

4. The pixel control device of claim 1, wherein the second energy storing device further comprises:
a fifth capacitor with variable capacitance, being coupled to the second terminal of the first capacitor; and
a sixth capacitor with fixed capacitance, being coupled to the drain of the second transistor.

5. The pixel control device of claim 1, wherein the first ratio is determined according to the electric charging ability of the first energy storing device, the second ratio is determined according to the electric charging ability of the second energy storing device, and the third ratio is determined according to the electric charging ability of the third energy storing device.

6. A display apparatus, comprising:
a display array, having a plurality of pixels, each of the pixels having a plurality of sub-pixels; and
a pixel control device, being electrically connected to one of the sub-pixels, the pixel control device being configured to provide a first voltage level, a second voltage level, and a third voltage level to the sub-pixel, the pixel control device comprising:
a first transistor, having a gate, a source and a drain;
a second transistor, having a gate, a source and a drain;
a third transistor, having a gate, a source and a drain;
a first capacitor with fixed capacitance, directly coupled between the drain of the first transistor and the drain of the second transistor;
a second capacitor with fixed capacitance, directly coupled between the drain of the second transistor and the drain of the third transistor;
a scan line, coupled to the gate of the first transistor, the gate of the second transistor and the gate of the third transistor, and for controlling the first transistor, the second transistor, and the third transistor to be switched on;
a first data line, coupled to the source of the first transistor and the source of the second transistor and for providing a first data-referenced voltage level to the first transistor and the second transistor when the first transistor and the second transistor are switched on;
a second data line, coupled to the source of the third transistor and for providing a second data-referenced voltage level to the third transistor when the third transistor is switched on;
a first energy storing device, being coupled to the drain of the first transistor, for providing the first voltage level in response to the first data-referenced voltage level when the first transistor is switched on;
a second energy storing device, being coupled to the second terminal of the first capacitor and the drain of the second transistor, for providing the second voltage level in response to the first data-referenced voltage level when the first transistor and the second transistor are switched on;
and a third energy storing device, comprising a seventh capacitor with variable capacitance and a eight capacitor with fixed capacitance, the seventh capacitor and the eight capacitor being coupled to the drain of the third transistor, for providing the third voltage level in response to the second data-referenced voltage level when the third transistor is switched on;
wherein the first voltage level and the first data-referenced voltage level form a first ratio, the second voltage level and the first data-referenced voltage level form a second ratio, and the third voltage level and the second data-referenced voltage level form a third ratio.

7. The display apparatus of claim 6, wherein the first capacitor has a first terminal and a second terminal, the first terminal of the first capacitor is coupled to the drain of the first transistor, the second terminal of the first capacitor is coupled the drain of the second transistor, the second capacitor has a first terminal and a second terminal, the first terminal of the second capacitor is coupled to the drain of the third transistor, and the second terminal of the second capacitor is coupled to the drain of the second transistor.

8. The display apparatus of claim 6, further comprising:
a third capacitor with variable capacitance, being coupled to the drain of the first transistor; and a fourth capacitor with fixed capacitance, being coupled to the drain of the first transistor.

9. The display apparatus of claim 6, further comprising:

a fifth capacitor with variable capacitance, being coupled to the second terminal of the first capacitor; and a sixth capacitor with fixed capacitance, being coupled to the drain of the second transistor.

10. The display apparatus of claim 6, wherein the first ratio is determined according to the electric charging ability of the first energy storing device, the second ratio is determined according to the electric charging ability of the second energy storing device, and the third ratio is determined according to the electric charging ability of the third energy storing device.

* * * * *